(12) United States Patent
Tian et al.

(10) Patent No.: US 11,467,037 B2
(45) Date of Patent: Oct. 11, 2022

(54) RAPID TEMPERATURE MEASUREMENT BY WAVELENGTH MODULATION SPECTROSCOPY

(71) Applicant: NEC Laboratories America, Inc., Princeton, NJ (US)

(72) Inventors: Yue Tian, Princeton, NJ (US); Da Pan, Jersey City, NJ (US)

(73) Assignee: NEC Corporation

( * ) Notice: Subject to any disclaimer, the term of this patent is extended or adjusted under 35 U.S.C. 154(b) by 393 days.

(21) Appl. No.: 16/838,212

(22) Filed: Apr. 2, 2020

(65) Prior Publication Data

US 2020/0319034 A1 Oct. 8, 2020

Related U.S. Application Data

(60) Provisional application No. 62/829,668, filed on Apr. 5, 2019.

(51) Int. Cl.
*G01J 5/60* (2006.01)
*G01J 5/00* (2022.01)

(52) U.S. Cl.
CPC ............. *G01J 5/601* (2013.01); *G01J 5/0014* (2013.01)

(58) Field of Classification Search
CPC .. G01J 5/601; G01J 5/0014; G01J 3/10; G01J 3/28; G01J 3/433
See application file for complete search history.

(56) References Cited

U.S. PATENT DOCUMENTS

| | | | |
|---|---|---|---|
| 2011/0150035 A1* | 6/2011 | Hanson | G01K 13/02 374/161 |
| 2012/0283961 A1* | 11/2012 | Wittmann | G01N 21/39 702/24 |
| 2014/0049777 A1* | 2/2014 | Sun | G01J 3/42 356/409 |
| 2014/0347667 A1* | 11/2014 | Depenheuer | G01N 21/85 356/409 |
| 2019/0195789 A1* | 6/2019 | Pan | G01J 3/433 |

* cited by examiner

*Primary Examiner* — David P Porta
*Assistant Examiner* — Gisselle M Gutierrez
(74) *Attorney, Agent, or Firm* — Joseph Kolodka

(57) ABSTRACT

Aspects of the present disclosure describe rapid temperature measurement by wavelength modulation spectroscopy (WMS) that determines gas temperature from $2f$ signals from two absorption lines by WMS methodologies even when the gas concentration is sufficiently high to saturate optical absorptions. In sharp contrast to the prior art, rapid temperature measurement by WMS according to aspects of the present disclosure employs both a $2f$ signal ratio and gas concentration determined from the $2f$ signal.

4 Claims, 6 Drawing Sheets

RAPID TEMPERATURE MEASUREMENT BY WAVELENGTH MODULATION SPECTROSCOPY

CROSS REFERENCE

This disclosure claims the benefit of United States Provisional Patent Application Ser. No. 62/829,668 filed Apr. 5, 2019 the entire contents of which is incorporated by reference as if set forth at length herein.

TECHNICAL FIELD

This disclosure relates generally to temperature measurement for immediate or later evaluation. More particularly, it describes rapid temperature measurement by wavelength modulation spectroscopy.

BACKGROUND

Wavelength modulation spectroscopy (WMS) is a widely used methodology used to determine trace gas concentrations by measuring a peak (or peak-trough) height of the second harmonic signal ($2f$) of the trace gas' absorption line. Additionally, the peak (or peak-trough) height ratio of $2f$ signals at two different absorption lines has been used to perform rapid temperature measurement of gases.

However, this temperature measure scheme requires that light absorptions by the gas at the two different lines are sufficiently low such that optical absorption by the gas being measured is not saturated. If the light absorption by the gas at either or both absorption lines is saturated, the peak (or peak-trough) height is nonlinearly dependent on gas concentration. As a result, the $2f$ signal ratio between the two absorption lines is not a single-value function of temperature and cannot be solely used to determine temperature.

SUMMARY

The above problem is solved and an advance in the art is made according to aspects of the present disclosure directed to a method for determining gas temperature from $2f$ signals from two absorption lines by WMS methodologies even when the gas concentration is sufficiently high to saturate optical absorptions.

In sharp contrast to the prior art, rapid temperature measurement by WMS according to aspects of the present disclosure employs both a $2f$ signal ratio and gas concentration determined from the $2f$ signal.

BRIEF DESCRIPTION OF THE DRAWING

A more complete understanding of the present disclosure may be realized by reference to the accompanying drawing in which.

Figure 1:
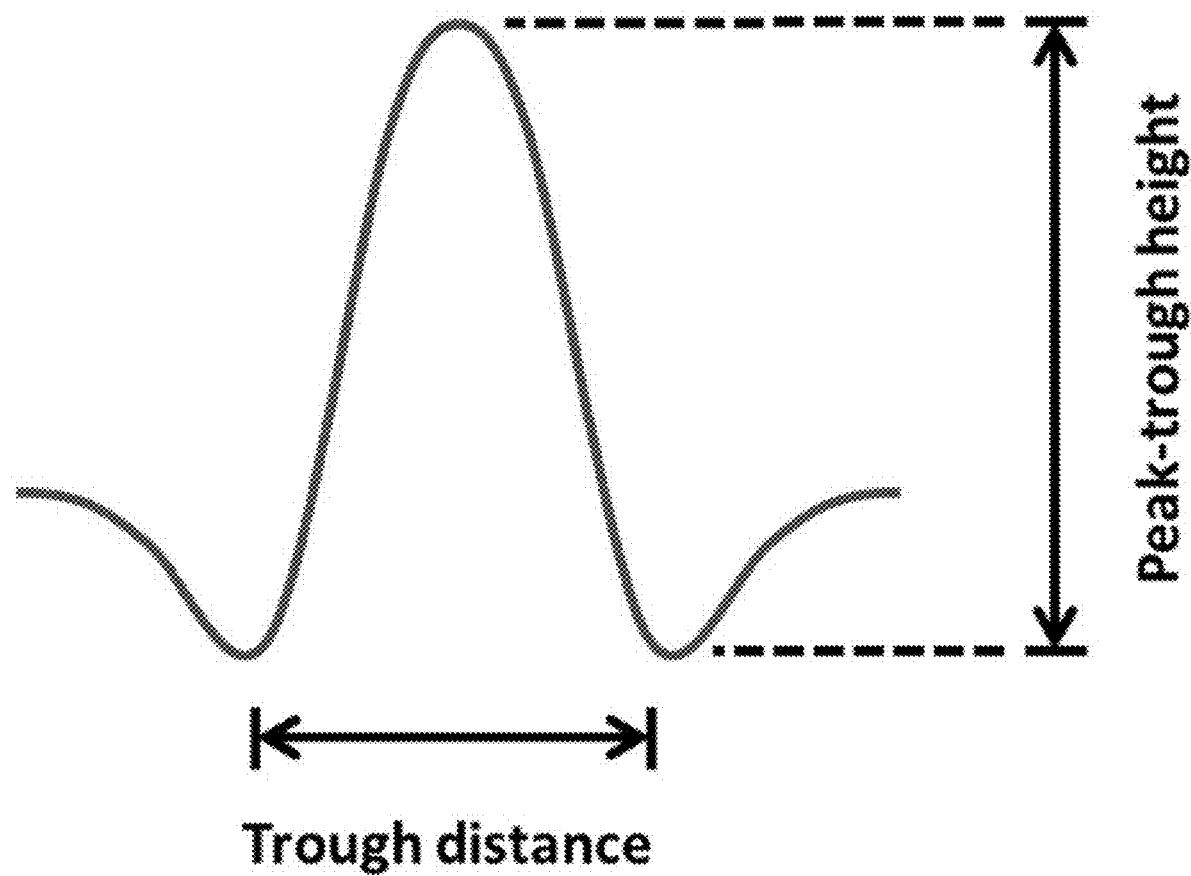
FIG. 1 shows a schematic plot of an illustrative gas absorption line's $2f$ signal when gas concentration is low and optical absorption is not saturated according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we begin by noting as is known that molecules can absorb light at certain wavelengths which causes them to transition from a lower energy level to an upper energy level. The amount of light that is absorbed is proportional to the fraction of molecules in an absorbing quantum state. Laser absorption spectroscopy (LAS) exploits this relationship to provide quantitative measurements of gas temperature and composition/concentration. Wavelength modulation spectroscopy (WMS) is a LAS technique that is known to provide improved measurements of gas(es).

In wavelength modulation spectroscopy (WMS) the wavelength of light emitted from a tunable light source—such as a diode laser—is modulated with a frequency $f_o$, while the wavelength is swept over a molecular absorption line of a gas component of interest in a gas sample. As the light propagates along a measurement path through the gas sample, wavelength dependent absorption converts some of the wavelength modulation into an amplitude modulation of the light. Thus, the light will have an overtone spectrum generated by the absorption, the harmonic content of the spectrum being dependent on the width and shape of the molecular absorption line in the gas and the etalons in the optical path of the measuring system. When the light then impinges onto a measuring detector, for example a photodiode, the detector output contains AC components at the modulation frequency $f_0$ and its higher harmonics $Mf_0$ (M=2,3,4, etc.). Demodulating the detector output at one of said higher harmonics—preferably at $2f$—shifts the measurement from frequencies near DC, where the light source is noisy, into a higher frequency range, where the noise is lower, thus improving the measurement sensitivity.

Turning now to FIG. 1, there it shows a schematic plot of an illustrative gas absorption line's $2f$ signal when gas concentration is low and optical absorption is not saturated according to aspects of the present disclosure. Also shown in that figure are portions of the plot that define a peak-trough height and trough distance.

Figure 2A:
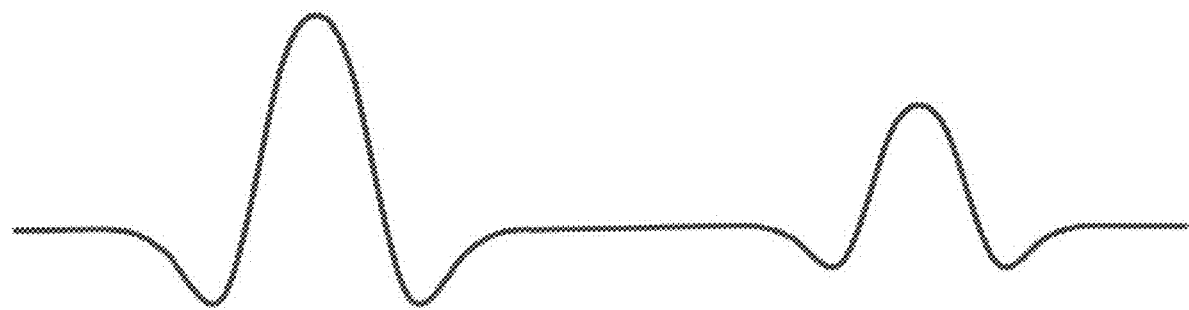
FIG. 2(A), FIG. 2(B), and FIG. 2(C) are schematic plots illustrating the $2f$ signal shape evolving as relative gas concentration increases from lowest relative concentration (FIG. 2(A)), to medium relative concentration (FIG. 2(B)), to highest relative concentration (FIG. 2(C)), according to aspects of the present disclosure.
Figure 2B:
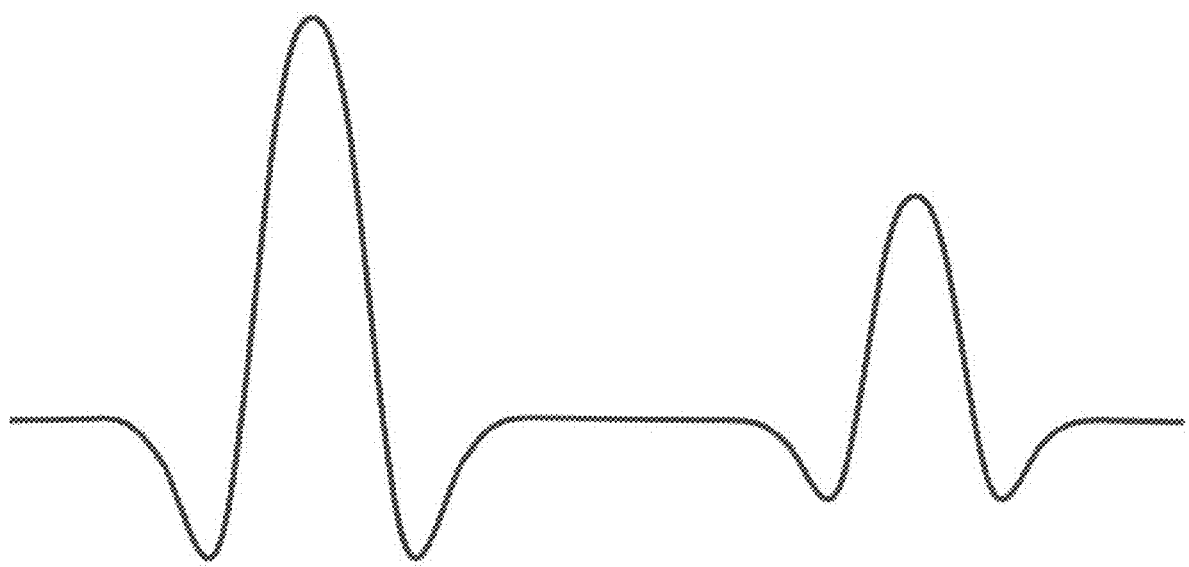
Figure 2C:
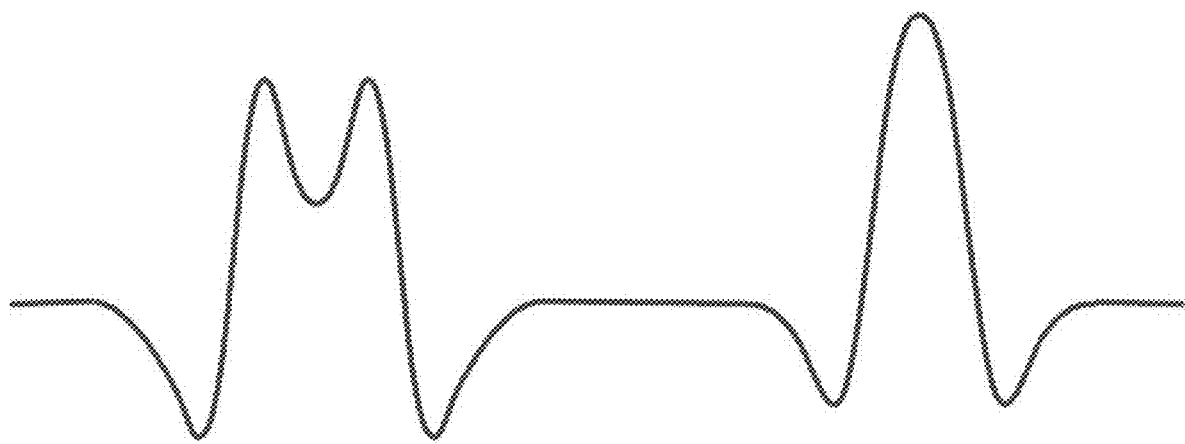

FIG. 2(A), FIG. 2(B), and FIG. 2(C) are schematic plots illustrating the $2f$ signal shape evolving/changing as a relative gas concentration increases from a lowest relative concentration (FIG. 2(A)), to a medium relative concentration (FIG. 2(B)), to a highest relative concentration (FIG. 2(C)), according to aspects of the present disclosure.

With simultaneous reference to these figures, it may be observed that in FIG. 2(A), two peaks of a $2f$ WMS signal for a gas sample exhibit different absorption strengths at two absorption lines at a certain temperature. When the gas concentration increases and the temperature is maintained constant, both peaks become higher due to stronger absorption at both lines—as shown in FIG. 2(B). Note that the ration of the two peak (or peak-trough) heights, however, stays the same since both peaks grow larger linearly with increasing gas concentration. As such, the same ratio represents (presents) the same temperature in FIG. 2(A) as in FIG. 2(B). Note further that if the gas concentration continues to increase, the absorption lines may become saturated, and the peak shape(s) may be distorted and not grow larger linearly with the increasing gas concentration as illustrated by the plot of FIG. 2(C). As may be observed from these figures, while the temperature represented by the plot of FIG. 2(C) is the same as that represented by FIG. 2(A), and FIG. 2(B), the height ratio between the two peaks in FIG. 2(C) is not the same anymore.

According to aspects of the present disclosure then, a gas concentration is introduced with the peak height ratio to measure the temperature by $2f$ signal with—according to this inventive disclosure—with saturated absorption peak(s). A calibration method employing a nonlinear fitting curve is utilized to determine/calculate the temperature.

Figure 3:
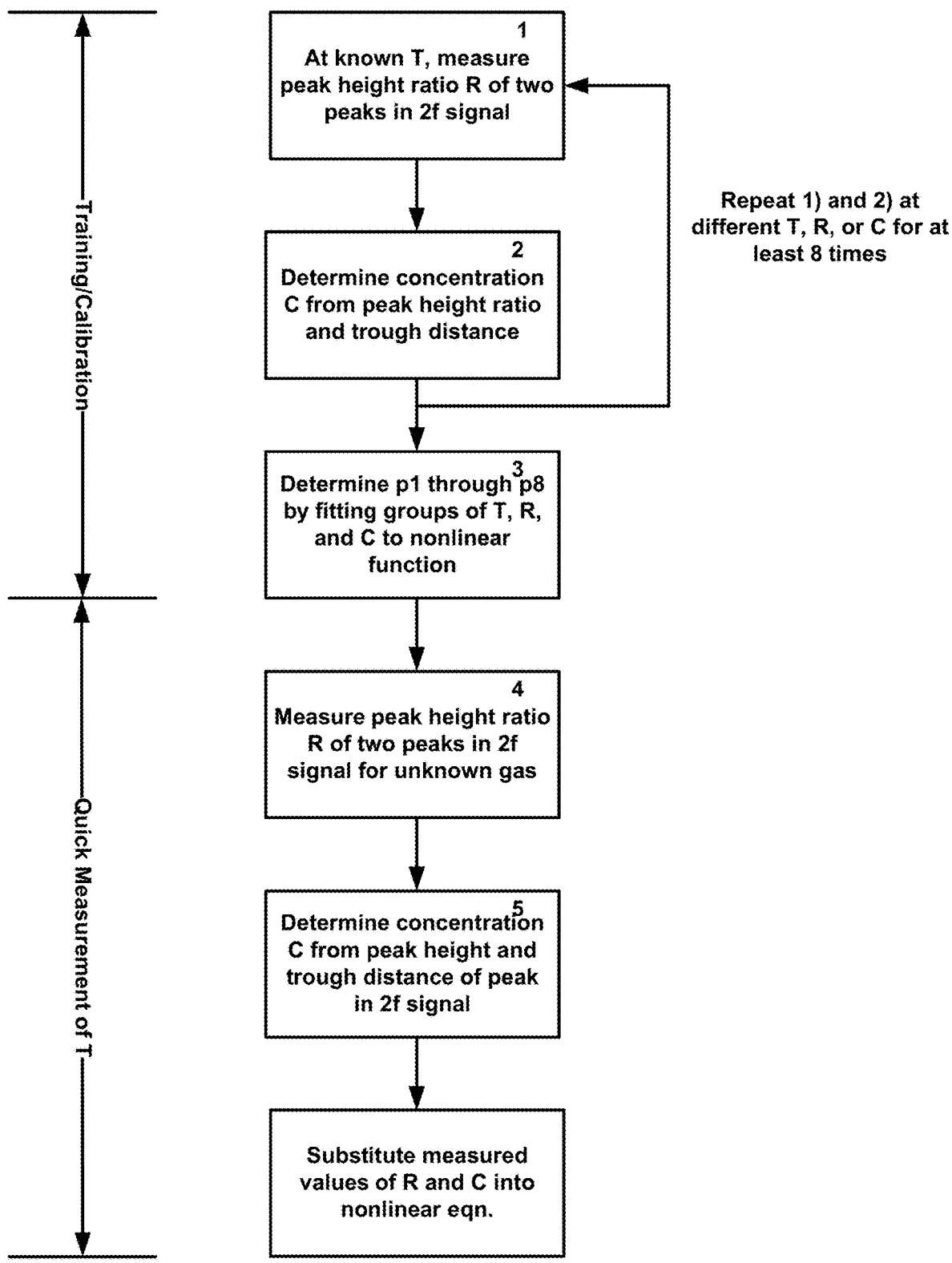
FIG. 3 is a flow diagram illustrating a calibration and WMS quick temperature measurement method according to aspects of the present disclosure.

FIG. 3 is a flow diagram showing a calibration and subsequent quick temperature measurement of T according to aspects of the present disclosure. With simultaneous reference to that figure and the following, the overall operation proceeds as follows.

Broadly, the gas temperature T is determined from peak (or peak-trough) height ratio R and gas concentration C, according to the following nonlinear function:

$$T = p_1 + p_2 \cdot C \cdot R + p_3 \cdot C^2 \cdot R^2 + p_4 \cdot C^3 \cdot R^3 + p_5 \cdot R + p_6 \cdot C^2 \cdot R^3 + p_7 \cdot C^6 \cdot R^6 + p_8 \cdot C^3 \cdot R^4$$

where $p_1$ to $p_8$ are all parameters determined by calibration.

To determine calibration parameters $p_1$ to $p_8$, the following steps are performed:

1. At a known gas temperature T, measure a current peak (or peak-trough) height ratio R of two absorption peaks included in the $2f$ signal for that gas;
2. Determine the current concentration C from the peak (or peak-trough) height ratio and the trough distance of either one of the peaks;
3. Repeat 1) and 2) at different T, R, or C for at least 8 times, determining at least 8 groups of T, R, and C;
4. Determine $p_1$ through $p_8$ by fitting the groups of T, R, C by the nonlinear function $$T = p_1 + p_2 \cdot C \cdot R + p_3 \cdot C^2 \cdot R^2 + p_4 \cdot C^3 \cdot R^3 + p_5 \cdot R + p_6 \cdot C^2 \cdot R^3 + p_7 \cdot C^6 \cdot R^6 + p_8 \cdot C^3 \cdot R^4.$$

With calibration performed one may quickly determine the temperature T of an unknown gas concentration by:
1) Measure the current peak (or peak-trough) height ratio R of the two absorption peaks in the $2f$ signal;
2) Determine the current concentration C from the peak (or peak-trough) height and the trough distance of either one of the two absorption peaks of in the $2f$ signal;
3) To determine T, substitute the measured values of R and C into the nonlinear equation $$T = p_1 + p_2 \cdot C \cdot R + p_3 \cdot C^2 \cdot R^2 + p_4 \cdot C^3 \cdot R^3 + p_5 \cdot R + p_6 \cdot C^2 \cdot R^3 + p_7 \cdot C^6 \cdot R^6 + p_8 \cdot C^3 \cdot R^4.$$

Figure 4:
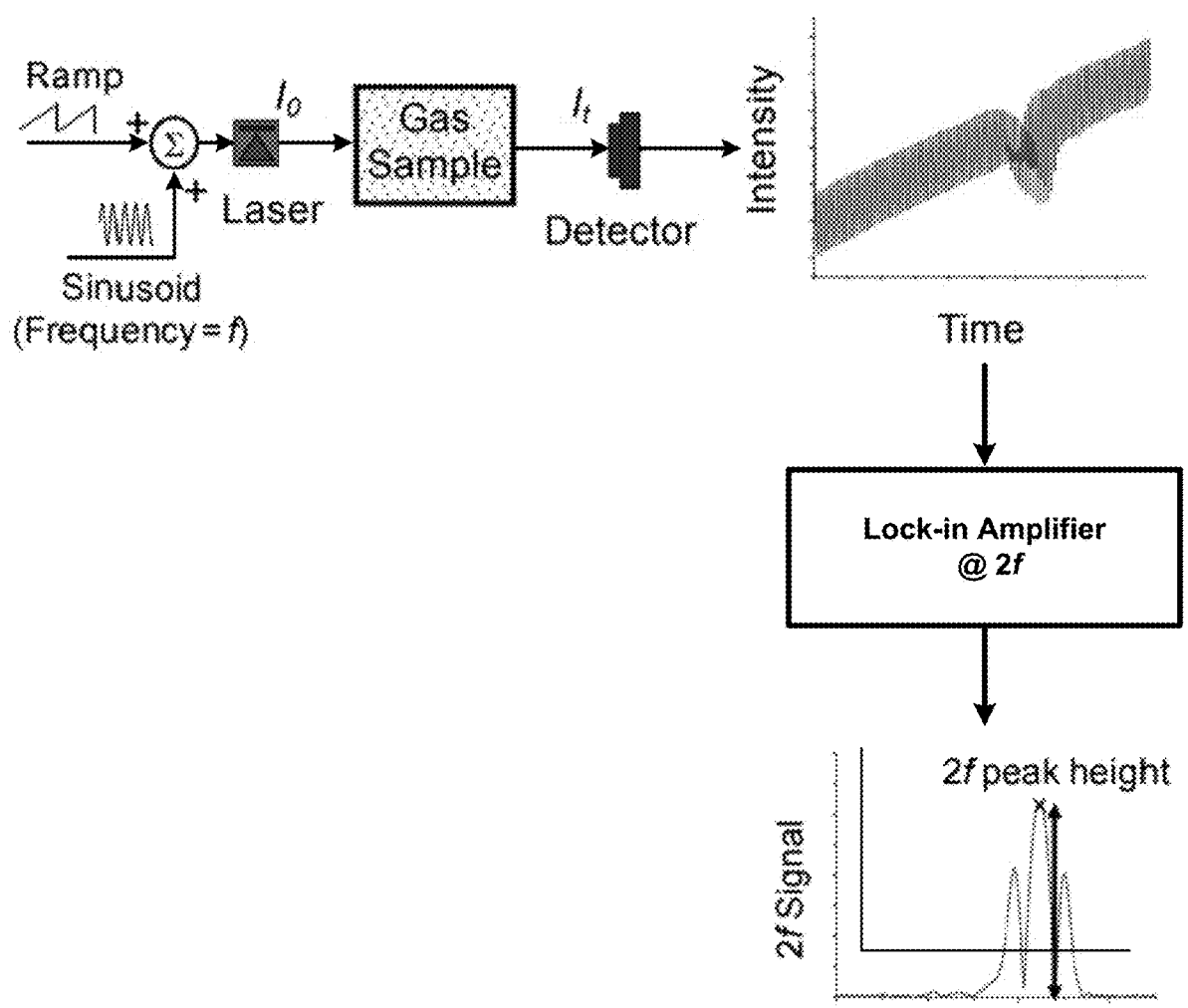
FIG. 4 is a schematic block diagram illustrating a system and high level process operable for WMS quick temperature measurement method according to aspects of the present disclosure.

Operationally, such calibration and temperature measurement may be advantageously performed by a system such as that shown in FIG. 4 in conjunction with a digital computer to perform the computational determinations. Such computational apparatus—in conjunction with the WMS apparatus shown in the figure—may be employed to construct a quick temperature measuring WMS apparatus that when programmed to perform our inventive method steps.

While we have presented this disclosure using some specific examples, those skilled in the art will recognize that our teachings are not so limited. Accordingly, this disclosure should be only limited by the scope of the claims attached hereto.

The invention claimed is:

1. A wavelength modulation spectroscopy (WMS) method for rapid temperature measurement of a gas comprising:
determining the gas temperature T from a peak or peak-trough height ratio R obtained from a WMS $2f$ signal and gas concentration C, according to the following nonlinear function $$T = p_1 + p_2 \cdot C \cdot R + p_3 \cdot C^2 \cdot R^2 + p_4 \cdot C^3 \cdot R^3 + p_5 \cdot R + p_6 \cdot C^2 \cdot R^3 + p_7 \cdot C^6 \cdot R^6 + p_8 \cdot C^3 \cdot R^4$$

where $p_1$ to $p_8$ are all parameters determined by calibration.

2. The wavelength modulation spectroscopy method for rapid temperature measurement of a gas according to claim 1 further comprising:
determining a set of calibration parameters $p_1$ to $p_8$ by
i) At a known gas temperature T, measure a peak or peak-trough height ratio R of two absorption peaks included in the $2f$ signal for that gas;
ii) Determine the current concentration C from the peak (or peak-trough) height ratio and the trough distance of either one of the peaks;
iii) Repeat i) and ii) at different T, R, or C for at least 8 times, determining at least 8 groups of T, R, and C; and
determining $p_1$ through $p_8$ by fitting the groups of T, R, C by the nonlinear function $$T = p_1 + p_2 \cdot C \cdot R + p_3 \cdot C^2 \cdot R^2 + p_4 \cdot C^3 \cdot R^3 + p_5 \cdot R + p_6 \cdot C^2 \cdot R^3 + p_7 \cdot C^6 \cdot R^6 + p_8 \cdot C^3 \cdot R^4.$$

3. The wavelength modulation method for rapid temperature measurement of a gas according to claim 2 further comprising:
measure the peak or peak-trough height ratio R of two absorption peaks in the $2f$ signal;
determine the current concentration C from the peak or peak-trough height and trough distance of either one of the two absorption peaks in the $2f$ signal;

determine T, by substituting the measured values of R and C into the nonlinear equation $$T = p_1 + p_2 C \cdot R + p_3 \cdot C^2 \cdot R^2 + p_4 \cdot C^3 \cdot R^3 + p_5 \cdot R + p_6 \cdot C^2 \cdot R^3 + p_7 \cdot C_6 \cdot R^6 + p_8 \cdot C^3 \cdot R^4.$$

4. The wavelength modulation method for rapid temperature measurement of a gas according to claim 3 wherein the gas is of unknown concentration.

\* \* \* \* \*